United States Patent [19]
Markwitz

[11] 4,081,789
[45] Mar. 28, 1978

[54] SWITCHING ARRANGEMENT FOR CORRECTING THE POLARITY OF A DATA SIGNAL TRANSMITTED WITH A RECURRENT CODE

[75] Inventor: Wernhard Markwitz, Munich, Germany

[73] Assignee: Siemens Aktiengesellschaft, Munich, Germany

[21] Appl. No.: 740,223

[22] Filed: Nov. 9, 1976

[30] Foreign Application Priority Data

Nov. 12, 1975 Germany .............................. 2550827

[51] Int. Cl.² ............................................... G06F 11/12
[52] U.S. Cl. ......................................... 340/146.1 AQ
[58] Field of Search ............ 340/146.1 AQ, 146.1 AV

[56] References Cited

U.S. PATENT DOCUMENTS

| | | | |
|---|---|---|---|
| 3,227,999 | 1/1966 | Hagelbarger | 340/146.1 AQ |
| 3,469,236 | 9/1969 | Gallager | 340/146.1 AQ |
| 3,593,282 | 7/1971 | Tong | 340/146.1 AQ |
| 3,842,400 | 10/1974 | Liefeld et al. | 340/146.1 AQ |
| 3,873,971 | 3/1975 | En | 340/146.1 AQ |

*Primary Examiner*—Charles E. Atkinson
*Attorney, Agent, or Firm*—Schuyler, Birch, Swindler, McKie & Beckett

[57] ABSTRACT

Apparatus is described for monitoring and, if necessary, correcting the polarity of a transmitted data signal. Syndrome signals are produced in accordance with the error pattern of the transmitted data signal. Coincidences between block timing pulses and the syndrome signal and block timing pulses and an inverted syndrome signal are counted, and when the respective counts reach predetermined levels counted output signals are produced. A polarity signal indicating proper or improper data signal polarity is produced from the counted output signals. The polarity of the transmitted data signal is adjusted in accordance with the value of the polarity signal.

6 Claims, 14 Drawing Figures

SWITCHING ARRANGEMENT FOR CORRECTING THE POLARITY OF A DATA SIGNAL TRANSMITTED WITH A RECURRENT CODE

BACKGROUND OF THE INVENTION

As is known, a syndrome is a multidigit bit sequence corresponding to a correction factor for a particular error pattern. Upon determination of a Syndrome, a correction can then be made by assuming that a particular syndrome always comes about as a result of the presence of one particular error pattern.

The invention relates to a switching arrangement for correcting the polarity of a data signal transmitted with recurrent code; the data signal is made up of a sequence of bits which are introduced at the receiving end into a shift register having two or more trigger circuits. In the process, a syndrome is obtained from a syndrome generating switching stage.

As is generally known, in the transmission of teleprinter-generated data via radio links the polarities of the data signal to be supplied at the sending end by the data source and of the data signal applied at the receiving end to a data sink must agree. When required, either one of the polarities may be changed by means of polarity-adjusting devices at the send-side modulator and at the receive-side demodulator, and in this way the correspondence between the two polarities can be established. This manual correction of polarities known from the prior art causes a certain loss of time and requires skilled personnel if frequent changeovers from a receiving station to various transmitting stations must be performed in complex data transmission systems.

It is an object of this invention to provide for a switching arrangement which monitors polarity during the transmission of a data signal with a recurrent code and automatically corrects it, if necessary.

SUMMARY OF THE INVENTION

In accordance with the invention, the above and other objects are achieved in that in a first embodiment constructed according to the invention a first inverter circuit is provided for producing from the syndrome signal a syndrome of opposite polarity. A scaling circuit produces each block timing pulse; the scaling circuit includes a first counter and a second counter, each having a counting input, a reset input and a counting output. In each scaling circuit the counting input of the first counter is connected to the reset input of the second counter, and, conversely, the counting inputs of the second counter are connected to the reset input of the first counter. The counting inputs of the first counters receive indicating pulses when one of the block timing pulses at a time coincides with the syndrome signal of opposite polarity. The counting inputs of the second counters receive indicating pulses when one of the block timing pulses at a time coincides with the syndrome. The first and second counters emit a counter reading signal over their counting outputs when a particular count is reached. A bistable switching stage is provided for receiving the counter reading signals and emitting a polarity signal signaling the proper or improper polarity of the data signal. In the data bus between an output of a trigger circuit and a data sink there is provided a polarity-correcting element which, as a function of the binary value of the polarity signal, does or does not reverse, as the case may be, the polarity of the data signal. All first and all second counters are reset with the counter reading signals.

In the alternative a counter can be provided for each block timing pulse such that the first inputs of the counters receive block timing pulses as indicating pulses. The second inputs receive the syndrome and count with a first or second binary value of the syndrome in a positive or negative direction. When a particular positive or negative count is reached, a counter reading signal is delivered over the first or second outputs. A bistable switching stage receives the counter reading signals at the input and delivers a polarity signal at the output which signals a proper or an improper polarity of the data signal. In the data bus between an output of a trigger circuit and a data sink there is provided a polarity-correcting element which, as a function of the binary value of the polarity signal, does or does not, as the case may be, reverse the polarity of the data signal. All counters are reset with the counter reading signals.

The switching arrangements constructed in accordance with the teachings of this invention are characterized in that they automatically deliver a data signal with the proper polarity to a data sink without wasting time and without the need for manual adjustments.

If the data signal is transmitted at a relatively high bit rate, it is convenient to generate for each block timing pulse one syndrome signal at a time and one syndrome signal of opposite polarity, at a time. The first counters receive indicating pulses when one syndrome of opposite polarity coincides with one of the block timing pulses. The second counters receive indicating pulses when a syndrome coincides with a block timing pulse. When the data signal is transmitted at a relatively low rate, it is convenient that the counting inputs of the first counters receiving indicating pulses when one of the block timing pulses at a time coincides with the syndrome of opposite polarity. The counting inputs of the second counters receive indicating pulses when one of the block timing pulses at a time coincides with the syndrome.

BRIEF DESCRIPTION OF THE DRAWINGS

The principles of the invention will be more readily understood by reference to the description of preferred embodiments given hereinbelow in conjunction with the accompanying drawings.

DETAILED DESCRIPTION OF THE PREFERRED EMBODIMENTS

Figure 1:
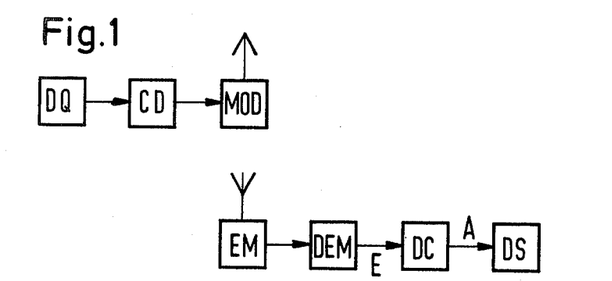
FIG. 1 is a schematic diagram of a data transmission system.

FIG. 1 shows, at the sending end, a data source DQ, a coder CD, and a transmitter and modulator MOD. As a data source DQ one may, for example, employ a teleprinter. The coder CE operates in a manner known from prior art and causes a coding customary in forward-error-correcting systems. Hence, the coder is also known as a FEC coder. The transmitter and modulator MOD are, as well, of known construction and operation.

The FIG. 1 system includes at the receiving end a receiver EM, a demodulator DEM, a decoder DC and a data sink DS. The demodulator DEM operates in a known manner to cancel the modulation effected at the sending end by use of the modulator MOD. The decoder DC cancels the coding effected in the send-side coder CD. In addition, the decoder DC contains a switching arrangement by means of which the polarity and the phase positions of the data signal A delivered over the output are automatically adjusted to the correct values.

The data signal A is applied over the output of the decoder DC to the data sink DS. Again, a teleprinter may serve as a data sink.

Figure 2:
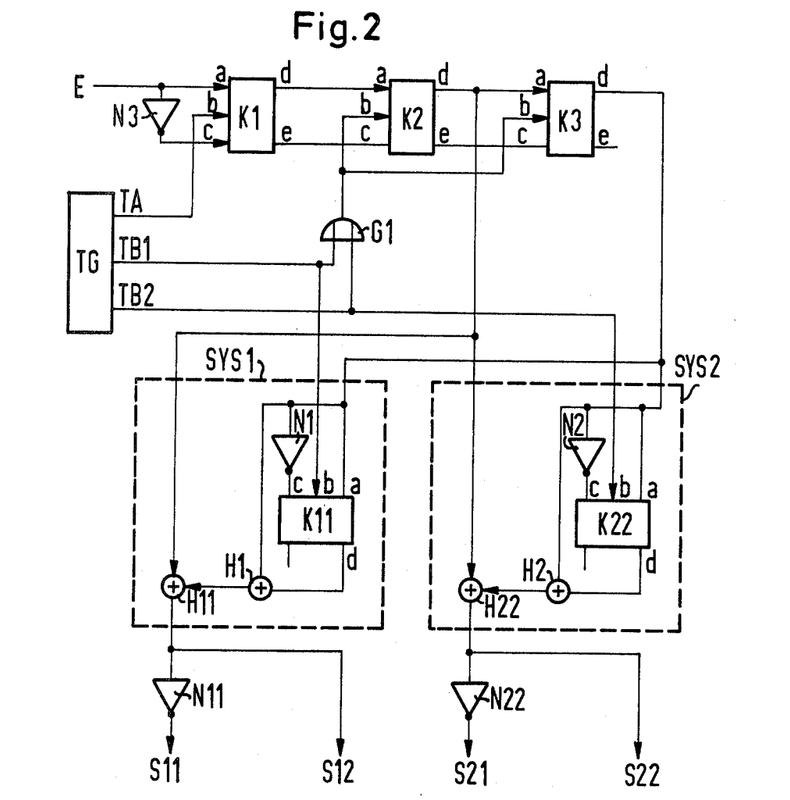
FIG. 2 is a schematic diagram showing two syndrome-producing stages.

The decoder DC is illustrated in greater detail in FIG. 2 and comprises trigger circuit K1, K2, K3, clock generator TG, NOT circuit N3, OR gate G1, the two syndrome signal stages SYS1, SYS2.

The data signal supplied by the demodulator DEM contains alternately occurring information bits and parity bits which are applied to the series connected bistable stages or trigger circuits K1, K2, K3 and are stored therein displaced in time in accordance with clock signals TA, TB1, TB2. The outputs of the trigger circuits K2 and K3 are connected to the syndrome signal stages SYS1 and SYS2. The syndrome stage SYS1 is operated responsive to clock signal TB1 and the syndrome stage SYS2 responsive to clock signal TB2. Both stages supply the syndrome signals S11 and S21.

The syndrome stages will be described in greater detail hereinbelow. The data signal E applied initially as a message contains, alternately, information bits I1, I2, I3, I4 . . . and parity bits P1, P2, P3 . . . Thus, at the input of the trigger circuit K1, the bits are received in the following sequences: I1, P1, I2, P2, I3, P3, I4, P4 . . . . This is also apparent from FIGS. 3 through 6. The parity bits P are dependent on two or more information bits I1, I2 . . . , in accordance with known recurrent codes. For simplicity, it is assumed in the illustrative embodiment of the invention that a particular parity bit is dependent on the sum modulo two of the two immediately preceding information bits. For example, the parity bit P2 is dependent on the sum modulo two of the two information bits I2 and I1. The parity bit P3 is dependent on the sum modulo two of the information bits I3 and I2.

The trigger circuits K1, K2, K3, K11, K22 may take on two stable states, of which one is called "0-state" and the other "1-state". The bistable trigger circuits have inputs $a$, $d$ and $e$. Throughout the duration of the 0-state, a 0-signal is applied at the output $d$, and a 1-signal at the output $e$. For the duration of the 1-state a 1-signal is applied at the output $d$ and a 0-signal at the output $e$. The trigger circuits are switched from their 0-state to their 1-state if at the input $b$ a transition takes place from a 1-signal to a 0-signal and if $a=1$ and $c=0$. The trigger circuits are switched from their 1-state to their 0-state if a transition also takes place at the input $b$ from a 1-signal to a 0-signal and if $a=0$ and $c=1$.

The syndrome stages SYS1 and SYS2 contain the trigger circuits K11, K22, NOT circuits N1, N2, and half-adders H1, H11, H2, H22.

FIGS. 3 through 6 show time diagrams of signals occurring during operation of the syndrome stages SYS1 and SYS2 of FIG. 1. The signals are partly designated with the same reference symbols as the components delivering them. Clock signals TA, TB1 and TB2 are produced by the clock generator TG. Data signal E is applied over the input $a$ of the trigger circuit K1, and the data signal inverted with the NOT circuit N3 is applied to the input $c$ of the trigger circuit K1. With the negative edge of one of the pulses of the data signal TA the information bit I1 is transferred to the trigger circuit K1. Similarly, all other information and parity bits are transferred to the trigger circuit K1 so that the signal K1 is delivered over the output $d$. The trigger circuit K2 accepts the signal at the times that are dependent on the clock signals TB1 and TB2. The trigger circuit K3 accepts in similar fashion the signals of the trigger circuit K2. Thus, as shown in FIGS. 3 through 6, the initially applied data signal E is stored in the individual trigger elements displaced in time, and the signals K1, K2 and K3 supplied by the trigger circuits are similar to the initially applied signal E.

The data signal E can be applied with the correct or incorrect polarity to the trigger circuit K1. Likewise, the phase position of the data signal E relative to the clock signals TB1 and TB2 can be correct or in error. Thus, there are four possible phase and polarity states for the data signal.

Figure 3:
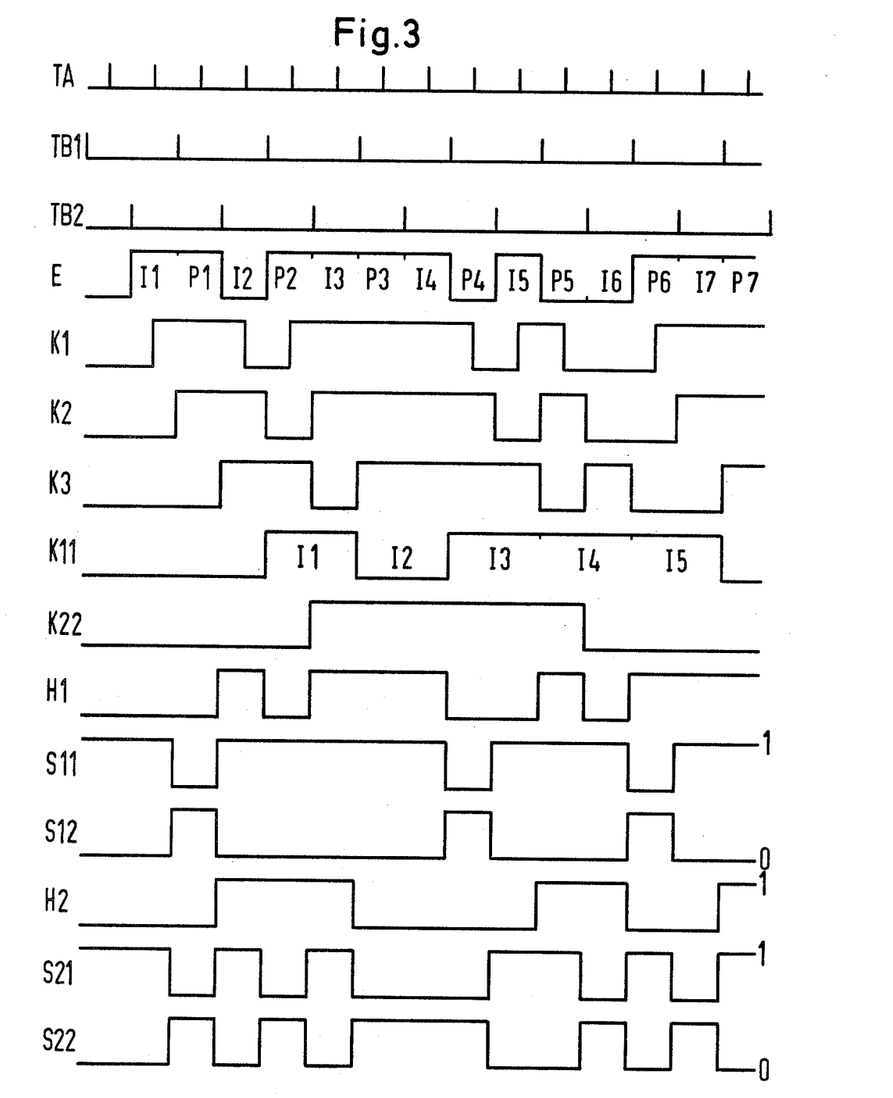
FIGS. 3 through 6 are time-waveform diagrams showing signals that are important in the operations of the syndrome stages shown in FIG. 2.
Figure 4:
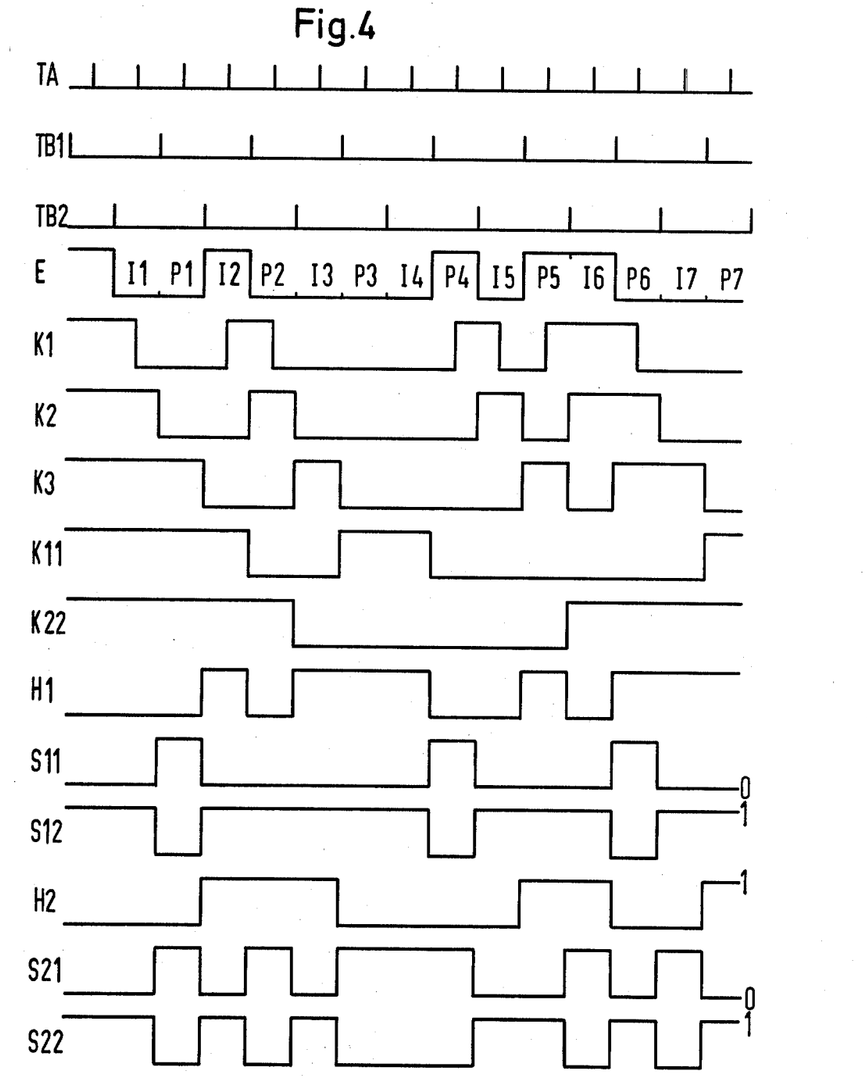
Figure 5:
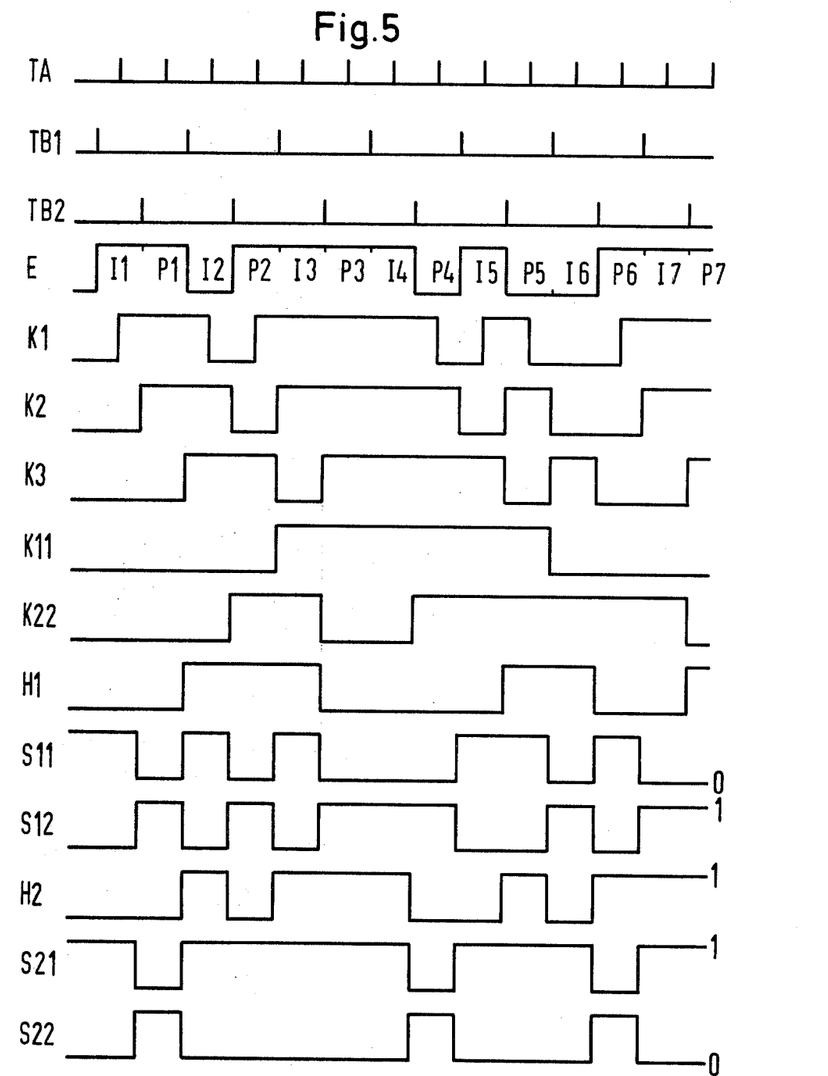
Figure 6:
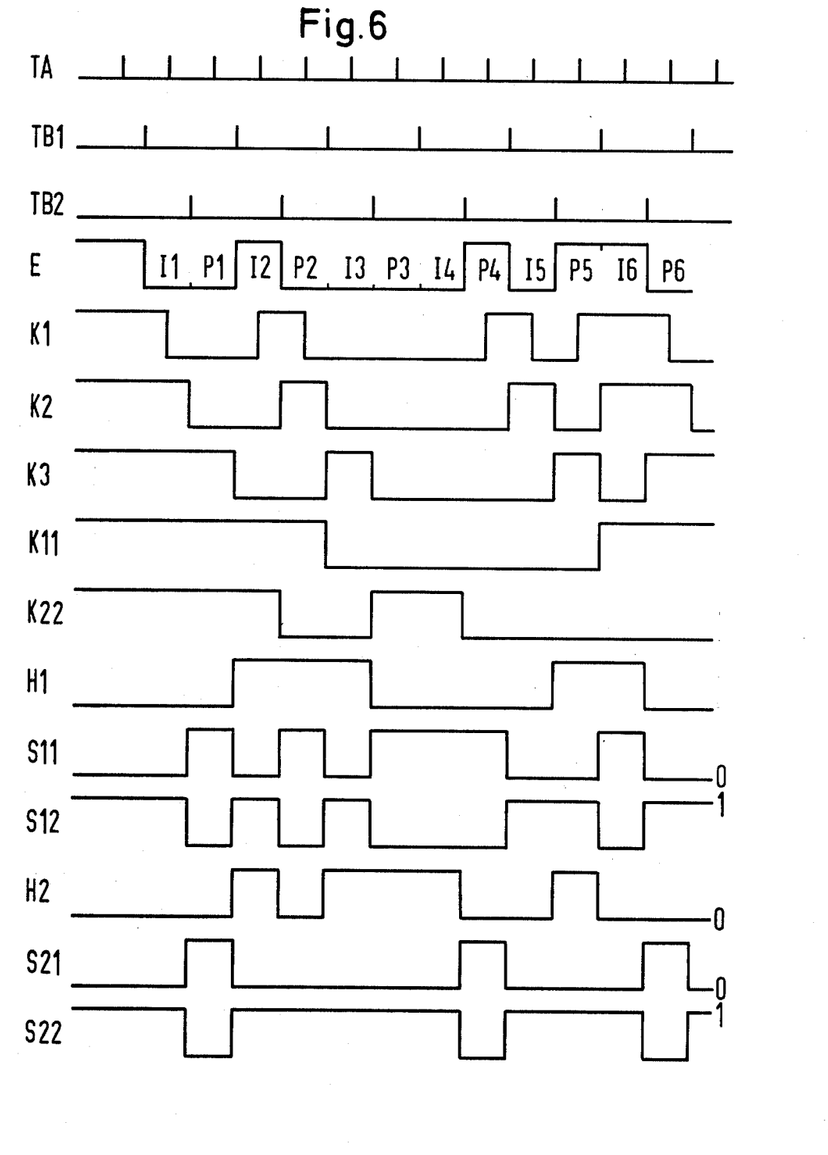

FIG. 3 relates to the case when both the polarity and the phase are proper, FIG. 4 to the case when the polarity is improper and the phase proper, FIG. 5 illustrates the situation when the polarity is proper and the phase improper, and FIG. 6 when both the polarity and the phase are improper.

FIG. 3 shows that the received information bits I1, I2 . . . are indicated with the trigger circuit K11. At the times of the pulses of the clock signal TB1, two consecutive information bits at a time are indicated with the signals K11 and K3. The sum modulo two of the signals K11 and K3 is produced in the half-adder H1 and, thereby, the sequence of the parity bits determined. The reeived parity bits of the signal K2 are compared in half-adder H11 with the determined parity bits of the signal H1, and a syndrome signal S11 is supplied by the half-adder H11. By use of a NOT circuit N11, the syndrome signal S12 of opposite polarity is derived from the syndrome S11.

Similarly, the syndrome signal S21 is derived with the syndrome stage SYS2, and syndrome signal S22 of opposite polarity using NOT circuit N12.

As shown in FIG. 4, the syndrome signals S11, S21 and the inverted syndrome signals S12 and S22 are derived in similar fashion. However, an opposite polarity of the signal E is assumed for this case.

As shown in FIG. 5, the syndrome signals S11, S21 and the inverted syndrome signals S12 and S22 are likewise derived, it now being assumed, however, that the signal E has the proper polarity but an improper phase position, as apparent from the phase position of the signal E relative to the block timing pulses TB1 and TB2.

FIG. 6 shows again the derivation of the syndrome signal, but in this example a signal E of opposite polarity and improper phase position is assumed.

The four cases: proper polarity, proper phase; improper polarity, proper phase; proper polarity, improper phase; and improper polarity, improper phase are indicated by the syndrome signals S11, S12, S21, and S22, respectively. By way of example, as apparent from FIG. 3, the syndrome signal S11 indicates, shortly before the pulses of the block timing pulse TB, the values 1 throughout and, thereby, the proper polarity and the proper phase. In contrast, the syndrome signal S12 indicates, prior to the block timing pulse TB1, the values 0 throughout, and the syndrome signals S21 and S22 have only occasionally the values 1, so that they do not indicate the proper polarity and the proper phase. FIG. 4 shows that the syndrome signal S12, shortly before the block timing pulses TB1, assumes the values 1 throughout and thereby indicates improper polarity and the proper phase. In contrast, the syndrome signal S11, shortly before the block timing pulses TB1, assumes the values 0 throughout, and the syndrome signals S21 and S22 have in some cases the values 0 and in others the values 1, so that they are incapable of indicating improper polarity and proper phase. According to FIG. 5, the syndrome signal S21 indicates the proper polarity and the improper phase, and according to FIG. 6, the syndrome signal S22 indicates the improper polarity and the improper phase.

Figures 7, 8:
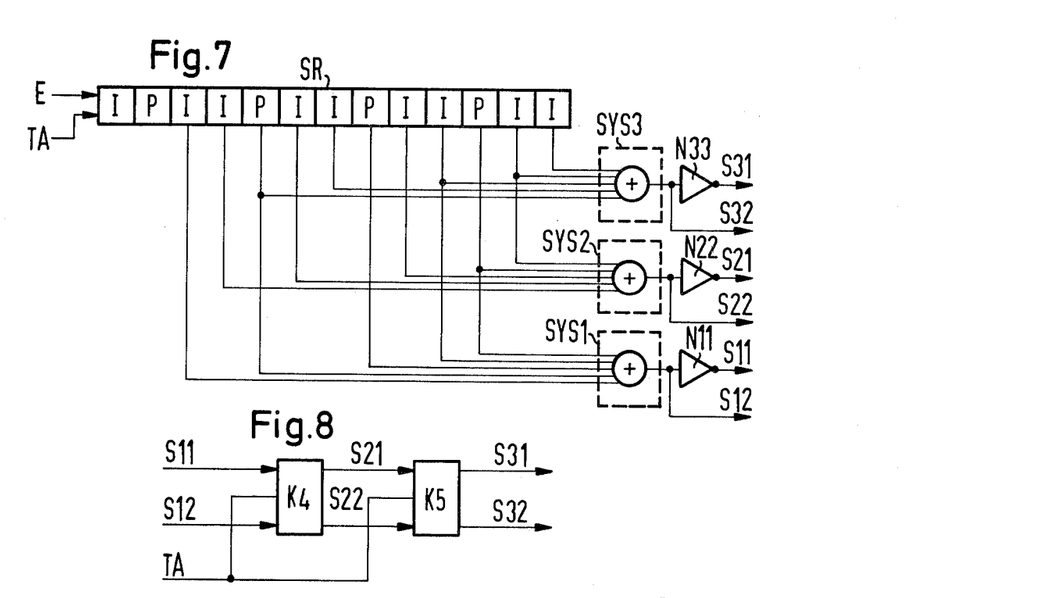
FIGS. 7 and 8 are schematic diagrams of circuits for producing two or more syndrome signals responsive to block timing pulses.

FIG. 7 shows a shift register SR to which the individual information bits I and the individual parity bits P are applied in serial fashion, along with the timing pulse TA. Three block timing pulses TB1, TB2, and TB3 are assumed, and by use of the associated syndrome stages SYS1, SYS2, SYS3, three pairs of syndrome signals S11, S12 and S21, S22 and S31, S32, respectively, are produced. Due to the NOT circuit N11, N22, N33 the syndrome signals S11, S12 and S21, S22 and S31, S32, respectively, have opposite polarities. A specified number of stages of the shift register SR are connected to the syndrome stage SYS1. The shift register stages disposed thereafter in the direction of signal flow are connected to the syndrome stage SYS2, so that with the latter bits occurring one bit later are considered. In similar fashion, the bits occurring two bit periods later than those considered with the syndrome stage SYS1 are considered with the syndrome stage SYS3.

FIG. 8 shows that the pairs of syndrome signals S21, S22 and S31, S32 may also be produced by means of the bistable trigger circuits K4, K5, respectively. The latter are controlled with the bit timing pulse TA and cause a delay of the initially applied syndrome signals S11, S12 by one bit period each.

Figure 9:
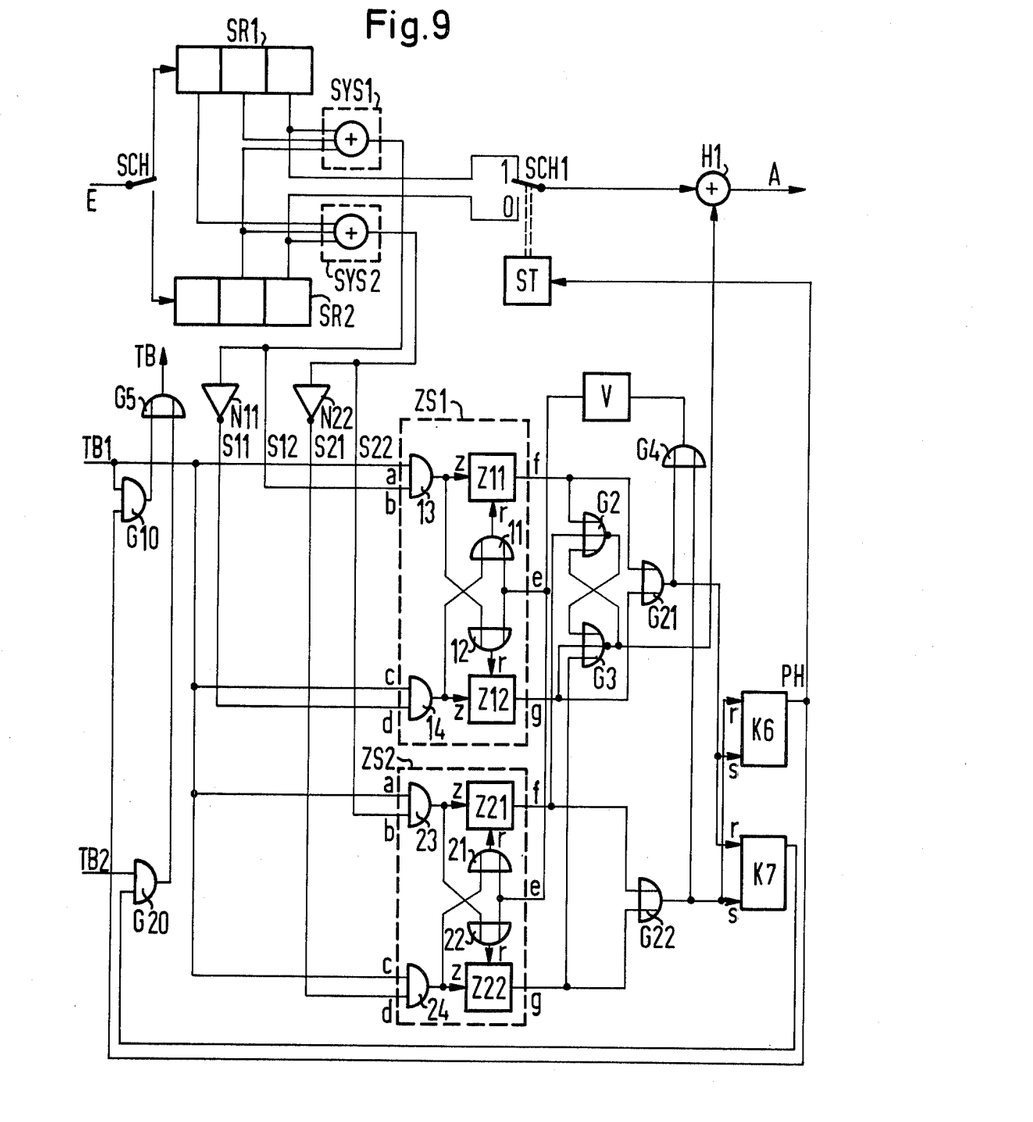
FIG. 9 is a schematic diagram of embodiment of a polarity-correcting circuit, wherein the correction is effected by use of two pairs of syndrome signals and one block timing pulse.

FIG. 9 shows an illustrative embodiment of a polarity-correcting circuit comprising scaling circuits ZS1, ZS2, a bistable switching stage having gates G2, G3 and a polarity-correcting element H1.

The data signal E is applied bitwise, and alternately, to the shift registers SR1 and SR2 over the switch SCH. The syndrome stages SYS1 and SYS2 produce the pair of syndrome signals S11, S12 and S21, S22. Each of the scaling circuits ZS1 and ZS2 has, respectively, a first counter Z11 and Z21 and a second counter Z12 and Z22. The counter Z11 receives an indicating pulse via AND gate 13 and counting input $z$, whenever the syndrome signal S12 coincides with the block timing pulse TB1. Concurrently with such an indicating, the counter Z12 is reset via gate 12. The counter Z1 receives an indicating pulse via AND gate 14 and its counting input $z$ whenever the block timing signal TB1 coincides with the syndrome signal S11. The counter Z21 receives an indicating pulse via AND gate 23 whenever the block timing pulse TB1 coincides with the syndrome signal S22 and, the counter Z22 receives an indicating pulse via AND gate 24, whenever the block timing pulse TB1 coincides with the syndrome signal S21. The counters Z21 and Z22 are reset over the gates 21 and 22 in the same manner as the gates Z11 and Z12.

When the counters Z11, Z12, Z22 indicate a prespecified counter reading, e.g., 32, they transmit a signal 1 over its output. For example, it is assumed that the counter Z11 receives 32 indicating pulses and, hence, transmits a signal 1 to the NOR gate G2. Since the NOR gate G2 only transmits a signal 1 if signals 0 are applied to all inputs, there occurs a signal 0 at the output, and thereafter, a signal 1 occurs at the output of gate G3, since only signals 0 are applied at this gate. The polarity signal P=1 delivered from the output of gate G3 signals that the polarity of the initially applied data signal E is improper, so that a correction is effected by means of half-adder H1. If the counter Z12 had delivered a signal 1, the polarity signal P=0 would have resulted at the output of gate G3, and this would not have reversed the polarity. If a signal 1 had been supplied over the output of the counter Z21, the polarity signal P=1 would have signaled the improper polarity of the data signal E. Thus, the signals 1 supplied over the outputs $f$ of the counters Z11 and Z21 indicate an improper polarity, and the signals 1 supplied over the outputs $g$ of the counters Z12 and Z22 indicate the proper polarity of the data signal E. The signals supplied over the outputs $f$ and $g$ are combined by the gates G21, G22, and G4, and delay circuit A supplies a signal 1 with a time lag, whenever one of the counters Z11, Z12, Z22 has indicated the prespecified counter reading. All counters are reset with such a signal from the output of the delay circuit V.

The trigger circuits K6 and K7 each have a set input $s$ and a reset input $r$ and serve to detect the proper phase position and proper block timing pulse. When a signal 1 is supplied from the output of the gate G21, the trigger circuit K6 is set, so that it supplies a signal 1 at its output, whereas the trigger circuit K7 is reset, so that it supplies a signal 0 at its output. A phase position signal PH=0 is supplied by the outputs of the trigger circuits K6 and K7. If, on the other hand, a signal 1 is supplied from the output of gate G22, the trigger circuit K7 is set and the trigger circuit K6 is switched to its normal condition so that the phase position signal PH=01 is supplied. The gate G10 becomes conductive with the phase position signal PH=10, so that the block timing pulse TB1 is supplied as a block timing pulse TB via the gate G5. On the other hand, the gate G20 becomes conductive with the phase position signal PH=01, so that the block timing pulse TB2 is supplied as a block timing pulse TB via the gate G5. Depending on which block timing pulse is detected as the proper one, switching stage ST controls the switch SCH1. With the phase position signal PH=10 the switching stage ST places the switch SCH1 in the switch position 1, whereas the switch position 0 is set with the phase position signal PH=01.

Figure 10:
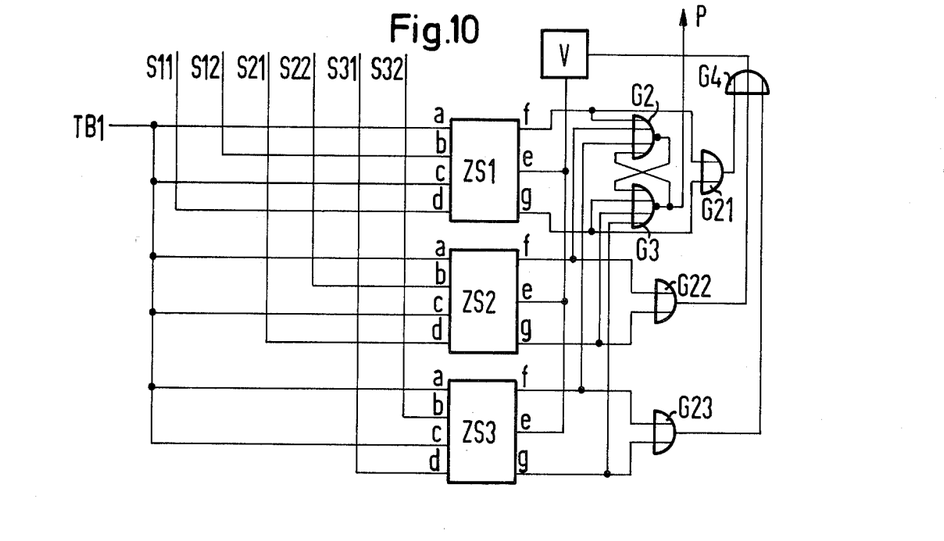
FIG. 10 is a schematic diagram of a polarity-correcting circuit wherein the correction is effected with two or more pairs of syndrome signals and a single block timing pulse.

FIG. 10 shows more generally the essential parts of a polarity-correcting circuit when the scaling circuits ZS1, ZS2, ZS3 are activated with several pairs of syndrome signals S11 and S12, S21 and S11, S31 and S32, respectively. In all, three block timing pulses TB1, TB2, and TB3 are assumed, to each of which is allocated a pair of syndrome signals S11 and S12, S21 and S22, S31 and S32, respectively. Thus, as many scaling circuits ZS1, ZS2, ZS3 are provided as there are block timing pulses and pairs of syndrome signals. The outputs $f$ and $g$ of all scaling circuits are connected to the inputs of the bistable switching stage made up of the gates G2 and G3. A pulse is supplied from gates G21, G22, G23 and G4, whenever one of the counters of the scaling circuits indicates the prespecified count and delivers a counter reading signal. In this case, a delayed pulse with which all counters are reset is supplied by the delay circuit V.

Figure 11:
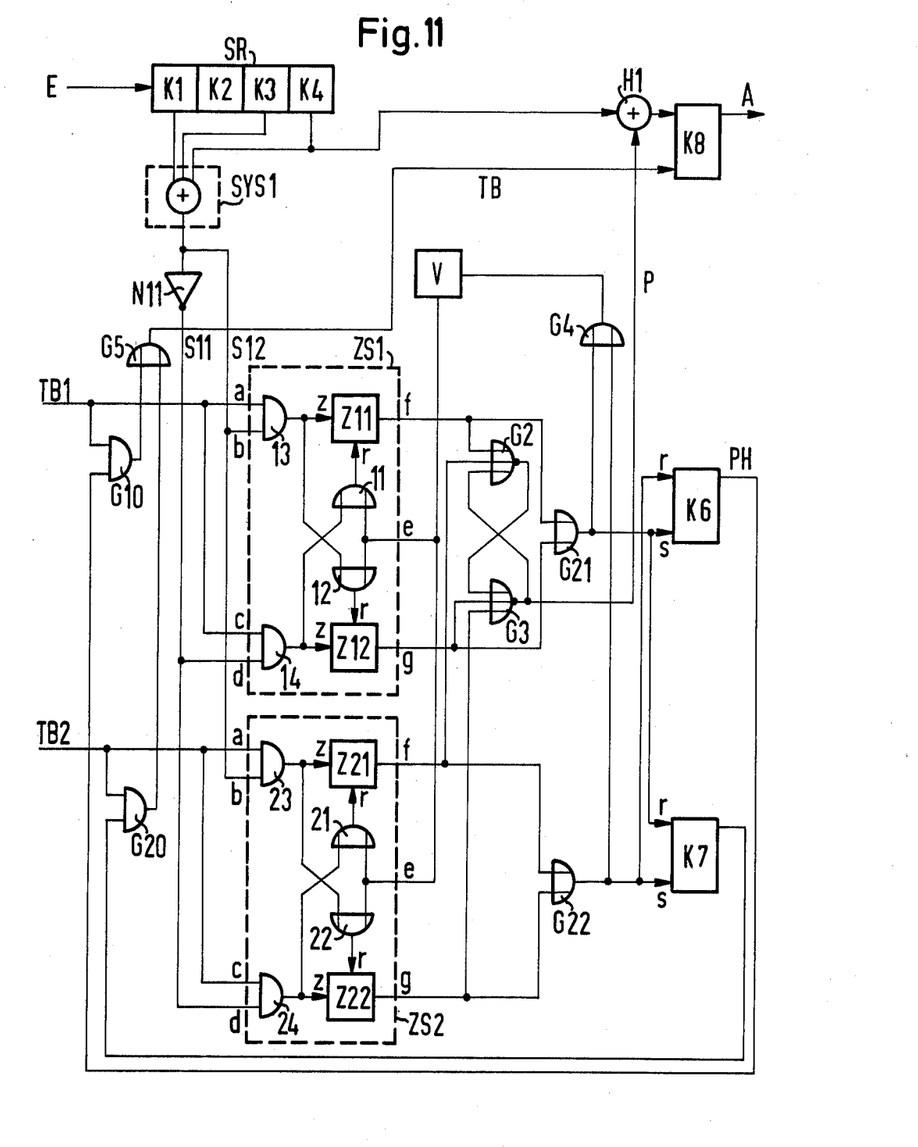
FIG. 11 is a schematic diagram of a second embodiment of a polarity-correcting circuit, wherein the correction is effected with one pair of syndrome signals and two block timing pulses.

FIG. 11 shows a second illustrative embodiment of a polarity-correcting circuit wherein the scaling circuits ZS1 and ZS2 are controlled by a single pair of syndrome signals S11, S12 and two or more block timing pulses TG1 and TG2.

The generation of the syndrome signals S11 and S12 is shown schematically by means of shift register SR, syndrome stage SYS1 and NOT circuit N11. The scaling circuits ZS1, ZS2, the gates G2, G3, G4, G21, G22, G5, G10, G20 and the trigger circuits K6, K7 are operated in like fashion, as described with reference to FIG. 9. For example, when the counter Z11 indicates its prespecified count, because the block timing pulse TB1 and the syndrome signal S12 coincide repeatedly, the polarity signal P=1 is supplied from the output of the gate G3, and the polarity of the data signal supplied by the trigger circuit K4 is corrected by means of the half-adder H1. As described with reference to FIG. 9, the block timing pulse TB is obtained. The trigger circuit K8 is now operated in the clock pulse of said block timing pulse TB, so that a string of information bits is supplied as a data signal A to a data sink not shown herein over the output of said trigger circuit K8.

Figure 12:
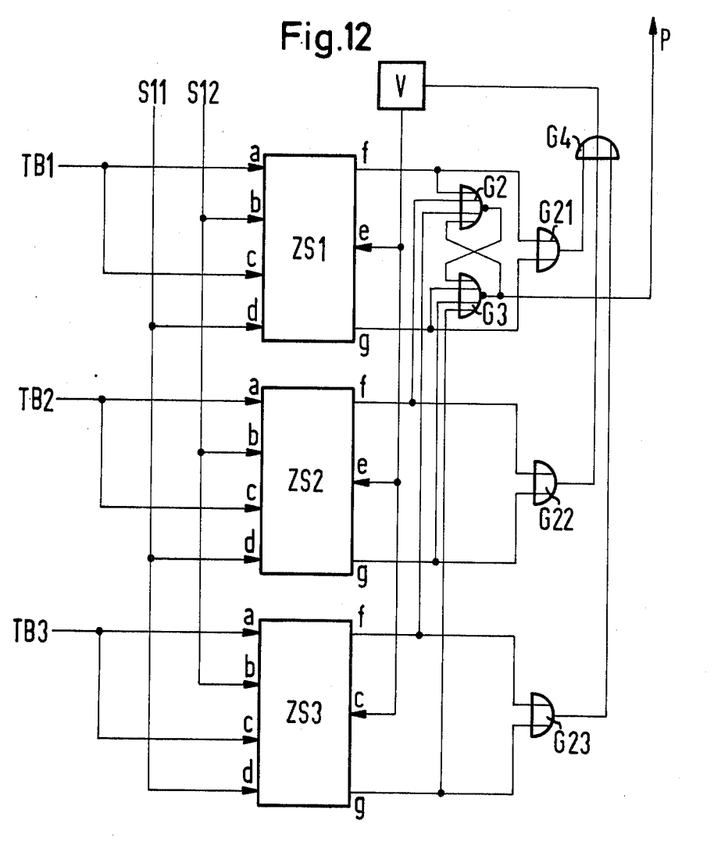
FIG. 12 is a schematic diagram of polarity-correcting circuit, wherein the correction is carried out with one pair of syndrome signals and two or more block timing pulses.

FIG. 12 shows somewhat more generally a polarity-correcting circuit wherein two or more block timing pulses and a single pair of syndrome signals are employed for the control of the scaling circuits. Thus, as many scaling circuits ZS1, ZS2 and ZS3 are provided as there are block timing pulses TB1, TB2, and TB3.

Figure 13:
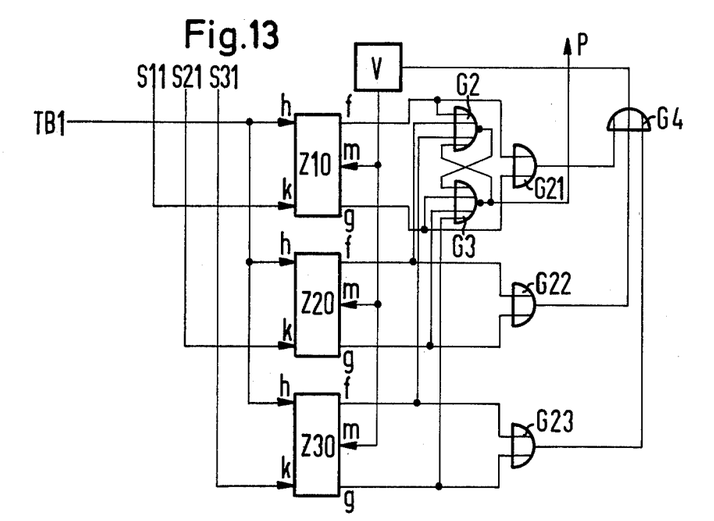
FIG. 13 is a schematic diagram of a polarity-correcting circuit wherein the correction is effected with two or more syndrome signals and a single block timing pulse by use of two or more bidirectional counters.

FIG. 13 is a schematic diagram of another polarity-correcting circuit wherein counters Z10, Z20, Z30 are employed. These counters respectively, receive at an input $h$ the block timing pulse TB1 as an indicating pulse. They receive at an input $k$ the syndrome signals S11, S21, S31, respectively, which results in the fixing of the counting direction of the counters as a function of the binary values of the syndrome signals. The counters Z10, Z20, Z30 count in positive counting direction with the syndrome signals S11=0, S21=0, S31=0, respectively, and send a counter reading signal from output $f$ after a predetermined positive count is reached. The counters Z10, Z20, Z30 count in negative counting directions with the syndrome signals S11=1, S21=1, S31=1, respectively, and send from the outputs $g$ a counter reading signal when a predetermined negative count is reached. The polarity signal P is obtained by means of the counter reading signals in same manner as shown in FIGS. 9 through 12. As apparent from FIG. 13, by using the gates G21, G22, G23, G4 and the delay circuit V a reset pulse is obtained in the same manner as shown in FIGS. 9 through 12; the reset pulse is applied to the inputs $m$ of the counters Z10, Z20, Z30 for resetting the counters to a predetermined initial counter reading.

Figure 14:
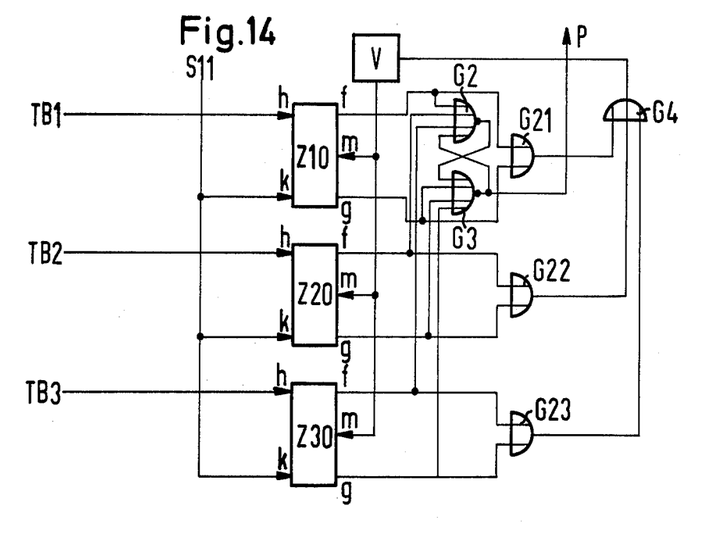
FIG. 14 is a schematic diagram of a polarity-correcting circuit wherein the correction is effected with a single syndrome signal and two or more block timing pulses by use of two or more bidirectional counters.

FIG. 14 shows another polarity-correcting circuit wherein the counters Z10, Z20, Z30 are similar to the counters Z10, Z20, Z30 shown in FIG. 13, but which are activated slightly differently. The counters Z10, Z20, Z30 in this embodiment receive at inputs $h$ various block timing signals TB1, TB2, TB3, respectively, as indicating pulses. All the counters receive the same syndrome signal S11 at inputs $k$, and the syndrome signal is again set to the counting direction of the counters as a function of the binary value of the syndrome. Specifically, the counters count with the syndrome signal S11=0 in a positive counting direction and with the syndrome signal S11=1 in a negative counting direction. As apparent from FIG. 13, the counter reading signals are sent from the outputs $f$ and $g$ in the same manner as shown in FIG. 13, and the resetting of the counters also occurs as shown in FIG. 13. The polarity signal P is obtained in the same manner as shown in FIGS. 9 through 12.

The principles of the invention are described hereinabove by describing the construction and operation of preferred embodiments. It is to be remembered that the described embodiments can be modified or changed in a number of ways known to those skilled in the art while remaining within the scope of the invention as defined by the appended claims.

I claim:

1. Apparatus for correcting the polarity of a transmitted data signal having a plurality of bits, comprising:
   multistage register means for receiving said data signal,
   syndrome circuit means for producing a syndrome signal in accordance with an error characteristic of said data signal,
   clock generator means for producing at least a bit timing pulse and at least two block timing pulses,
   inverter circuit means for producing an inverted syndrome signal from said syndrome signal,
   a number of scaling circuit means corresponding to the number of said block timing pulses, each scaling circuit having first and second binary counters and wherein a counting input on each of said counters is connected to a reset input on the other of said counters,
   means for producing first indicating pulses upon coincidence between said block timing pulses and said inverted syndrome signal, said first indicating pulses being coupled to counting inputs of said second binary counters,
   means for producing second indicating pulses upon coincidence between said block timing pulses and said syndrome signal, said second indicating pulses being coupled to counting inputs of said first counters,
   output means for producing counting output signals from said first and second binary counters when predetermined counting levels have been reached, switching means, responsive to said counting output signals, for producing a polarity signal indicating the correctness of the polarity of said data signal and polarity adjusting means supplied with said polarity signal and operative to change the polarity of said data signal when the polarity signal indicates incorrectness of the polarity of the data signal.

2. The apparatus defined in claim 1 further comprising:

a number of said syndrome circuit means and a number of said inverter circuit means corresponding to the number of said block timing pulses, said means for producing first indicating pulses being operable upon coincidence between said inverted syndrome signal and one of said block timing pulse and said means for producing second indicating pulses being operable upon coincidence between said syndrome signal and said one block timing pulse.

3. The apparatus defined in claim 1 wherein said means for producing first indicating pulses is operable responsive to coincidence between said inverted syndrome signal and one of said block timing pulses at a time and wherein said means for producing second indicating pulses is operable responsive to coincidence between said syndrome signal and one of said block timing pulses at a time.

4. Apparatus for correcting the polarity of a transmitted data signal having a plurality of bits, comprising:

multistage register means for receiving said data signal, syndrome circuit means for producing a syndrome signal in accordance with an error characteristic of said data signal, clock generator means for producing at least a bit timing pulse and at least two block timing pulses, a number of binary counters corresponding to the number of said block timing pulses, each said counter having a first input connected to receive said block timing pulses as indicating pulses, a second input for receiving said syndrome signal, said counter being operable to count in a positive or negative direction in dependence on the value of said syndrome signal, and first and second counter outputs for producing first or second counter reading signals when said counter reached predetermined positive or negative values, switching means operable responsive to said first and second counter reading signals for producing a polarity signal indicating the correctness of the polarity of said data signals, and polarity adjusting means supplied with said polarity signal and operative to change the polarity of said data signal when the polarity signal indicates incorrectness of the polarity of the data signal.

5. The apparatus defined in claim 4 wherein said first inputs of said number of binary counters all receive the same one of said block timing pulses and wherein said second inputs each receive a differing syndrome signal corresponding to different ones of said block timing pulses.

6. The apparatus defined in claim 4 wherein said first inputs of said number of binary counters each receive a different one of said block timing pulses and said second inputs receive in common a syndrome signal.

* * * * *